No. 880,854. PATENTED MAR. 3, 1908.
J. P. A. ANDERSON.
LIGHTNING PROTECTOR ATTACHMENT FOR TREES.
APPLICATION FILED FEB. 23, 1907.
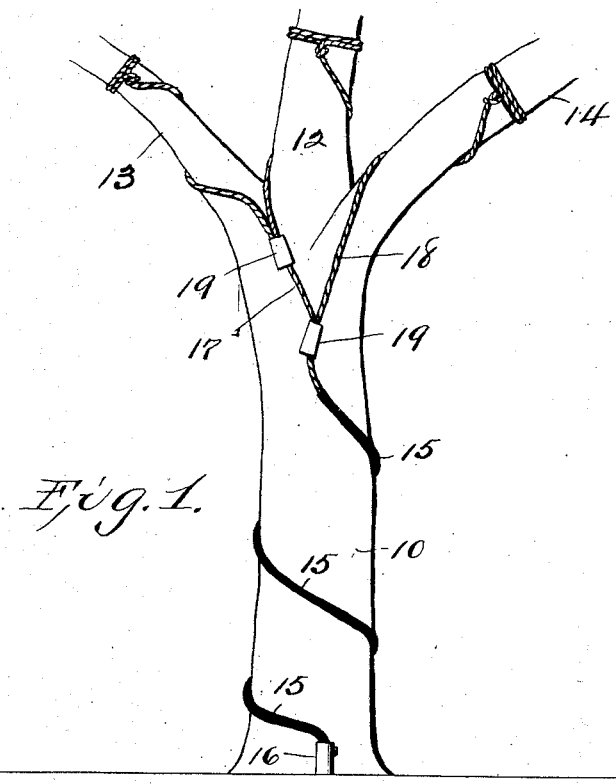
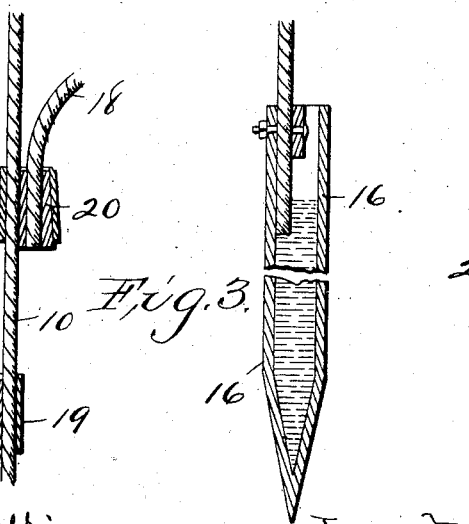
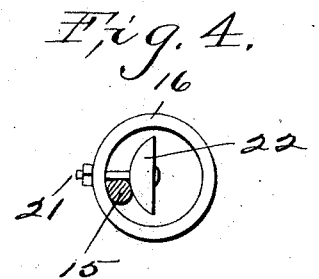
Witnesses:
R. C. Orwig.
Edith N. Dunn Orwig.
Inventor: John P. A. Anderson
By Thomas G. Orwig, Attorney

UNITED STATES PATENT OFFICE.

JOHN P. A. ANDERSON, OF MADRID, IOWA.

LIGHTNING-PROTECTOR ATTACHMENT FOR TREES.

No. 880,854.     Specification of Letters Patent.     Patented March 3, 1908.

Application filed February 23, 1907. Serial No. 359,495.

*To all whom it may concern:*

Be it known that I, JOHN P. A. ANDERSON, a citizen of the United States, residing at Madrid, in the county of Boone and State of Iowa, have invented a new and useful Lightning-Protector Attachment for Trees, of which the following is a specification.

My object is to protect trees from damage and destruction and to protect persons and animals contiguous to trees when the trees are struck by lightning.

My invention consists in connecting a lightning rod with a tree and a conductor fixed in the ground as hereinafter set forth, pointed out in my claims and illustrated in the accompanying drawings, in which:—

Figure 1 shows the trunk of a tree having branches at its top and a lightning rod connected with the trunk and branches and a conductor fixed in the ground as required for practical use. Fig. 2 is an enlarged view that shows the manner of connecting branches with the main conductor or rod. Fig. 3 is an enlarged view that shows the lower end of the main conductor connected with an auxiliary conductor adapted to be driven into the ground. Fig. 4 is a top view that shows how the conductor is fixed to the auxiliary conductor.

The numeral 10 designates a tree and 12, 13 and 14 branches. An insulated lightning conductor, 15, is coiled around the trunk of the tree and its lower end fixed in a tubular metal stake, 16, that is open at its top and closed at its bottom to admit and retain water.

It is obvious the electric conductor, 15, may be a single copper rod or a plurality of copper wires twisted together and insulated by inclosing it in a rubber tube or in any suitable way.

Branch electric conductors, 17 and 18 are attached to the main conductor 15 at different points of elevation by means of clamping devices, as shown in Fig. 2, or in any suitable way and then coiled around branches of the tree and fastened as shown in Fig. 1.

The clamping devices consists of short tapering metal tubes, 19, and smaller wedge-shaped tubes, 20, that are fixed to the ends of the branch conductors, 17 and 18 by drawing the tube 20 into the tube 19, as shown in Fig. 2, or in any suitable way.

To fix the conductor 15 to the stake 16 I place a washer 22 on a bolt 21 and a nut on the bolt to draw the washer upon the conductor as shown in Fig. 4, or in any suitable way as required to securely connect the conductor to the stake.

Having thus set forth the purpose of my invention and the manner of its construction and application, its practical operation and utility will be obvious to persons familiar with the art to which it pertains.

What I claim as new and desire to secure by Letters-Patent, is—

1. A tree protector, consisting of a main metallic conductor embracing the trunk of the tree and in electrical connection with the ground and coacting metallic conductors clamped to said main conductor and embracing the branches of the tree.

2. The herein described tree protector comprising a spiral main conductor encircling the trunk of the tree and in electrical connection with the earth and spiral branch conductors clamped thereto and encircling the branches of the tree.

JOHN P. A. ANDERSON.

Witnesses:
   M. H. SCHOOLER,
   G. C. CARLSON.